M. C. ROSENFELD.
CONDUIT CONNECTION FOR OUTLET BOXES.
APPLICATION FILED JULY 18, 1917.
1,356,831.
Patented Oct. 26, 1920.
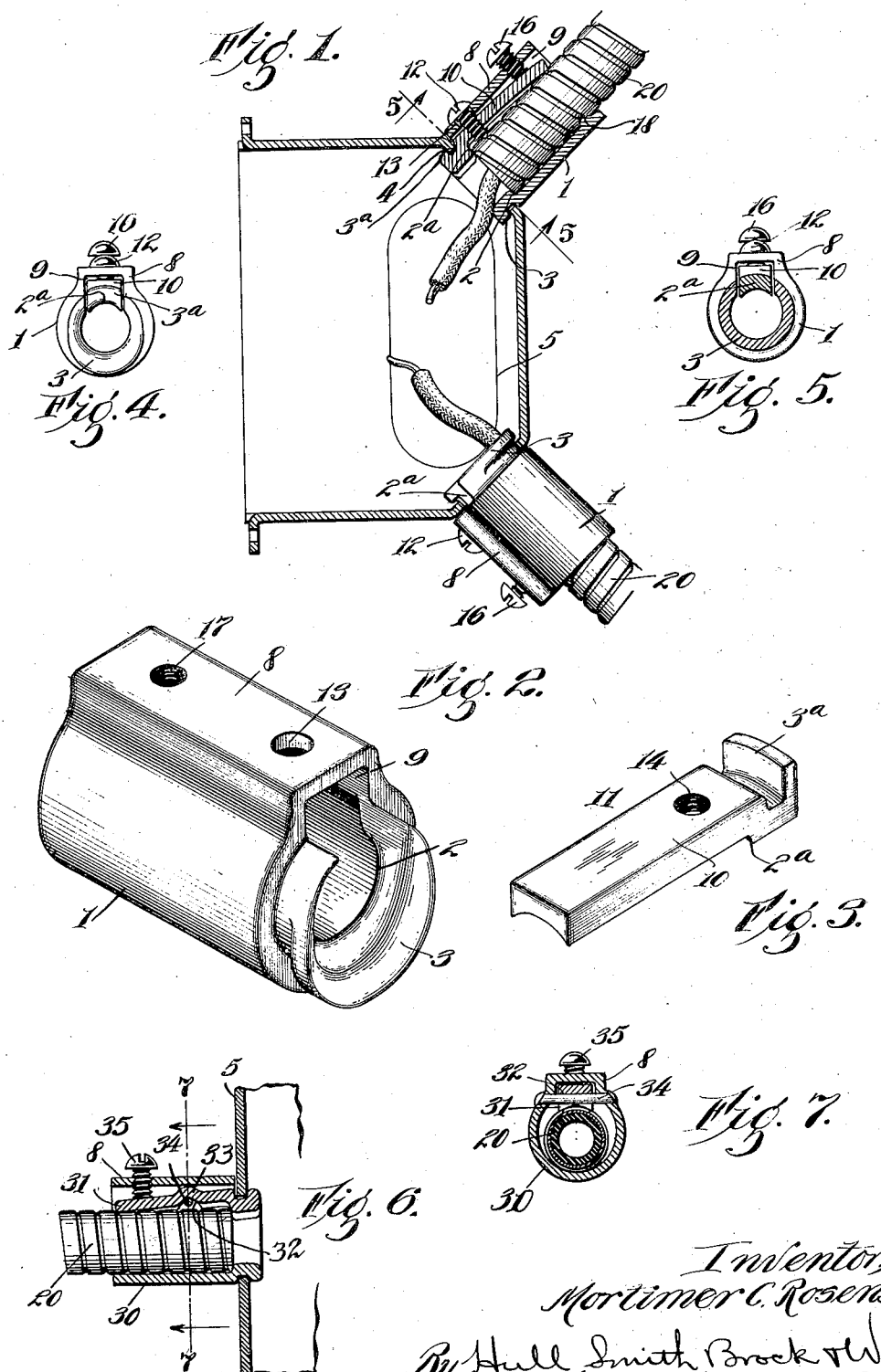
Inventor,
Mortimer C. Rosenfeld.
By Hull, Smith, Brock & West
Attys.

UNITED STATES PATENT OFFICE.

MORTIMER C. ROSENFELD, OF CLEVELAND, OHIO, ASSIGNOR TO THE ADAPTI COMPANY, OF CLEVELAND, OHIO, A CORPORATION OF OHIO.

CONDUIT CONNECTION FOR OUTLET-BOXES.

1,356,831.  Specification of Letters Patent.  Patented Oct. 26, 1920.

Application filed July 18, 1917. Serial No. 181,230.

*To all whom it may concern:*

Be it known that I, MORTIMER C. ROSENFELD, a citizen of the United States, residing at Cleveland, in the county of Cuyahoga and State of Ohio, have invented a certain new and useful Improvement in Conduit Connections for Outlet-Boxes, of which the following is a full, clear, and exact description, reference being had to the accompanying drawings.

This invention relates to an improved coupler for connecting the ends of electric wire conduits to outlet boxes, switch boxes, or like receptacles, it being understood by those familiar with the subject at hand, that boxes or receptacles of the class alluded to have openings (originally closed by "knockouts") through which the wires are led. For convenience of description, the opposed edges of these openings will be referred to hereinafter as "lips."

The invention has for its objects the production of a simple and economical self-contained coupler of the above character which is extremely convenient of use and is highly effective in securing a conduit to a box or receptacle of the aforesaid nature.

To these ends the invention provides a tubular body, and a retaining element carried by and extending along one side of the body and capable of being rocked longitudinally or moved at its opposite ends radially with respect to the body, the body and element having opposed lip engaging portions. Means are included for moving the element as aforesaid, so that, upon inserting the lip engaging portions of the coupler into an opening of a box or receptacle and actuating the above mentioned means, said portions may be separated or expanded into holding engagement with the lips, while (simultaneously under certain conditions and especially in one embodiment of my invention) the opposite end of the element may be moved inward toward the opposed wall of the body to clamp between it and said wall the previously inserted end of a conduit.

Two modifications of my invention are illustrated in the accompanying drawing, and these are susceptible to structural changes without departing from the spirit of the invention the scope whereof is co-extensive with the breadth of the annexed claims.

Figure 1 is a sectional view of a switch-box or receptacle to which conduits are connected by means of my improved coupler; Fig. 2 is a perspective view of the body of the coupler; Fig. 3 is a similar view of the retaining element; Fig. 4 is an end elevation of the coupler; Fig. 5, a section on the line 5—5 of Fig. 1, with the conduit and wire removed; and Figs. 6 and 7 are longitudinal and transverse sections, respectively, of a modification.

The body portion 1 is shown as generally cylindrical. At one end it is provided with an internal shoulder 2 extending throughout the greater part of its circumference, and from the inner edge of this shoulder protrudes a lip engaging portion 3 of a width permitting it to be passed freely through one of the openings 4 in the box or receptacle 5. An offset 8 extends along the side of the body opposite that having the lip engaging portion, said offset providing recess or channel 9 on the interior of the body. The tongue 10 of a retaining element 11 reposes within the recess 9 and (in the form of the invention shown in Figs. 1 to 5) is held therein by a screw 12 which passes freely through an aperture 13 in the wall of the offset 8 and is threaded into an aperture 14 of the retaining element. The forward end of the tongue is turned inward in the plane of the shoulder 2, as indicated at 2ª, to constitute a continuation of that shoulder and therebeyond is provided with a lip engaging portion 3ª which is opposed to the corresponding portion of the body.

From the foregoing construction it is obvious that by turning the screw 12 in an appropriate direction the adjacent end of the retaining element may be moved inward to cause a contraction of the lip engaging portions 3 and 3ª so that said portions may be projected, by first inserting one and then the other, through an opening 4 of the box or receptacle, after which the screw 12 may be turned in the opposite direction to draw the retaining element back into the recess 9 and expand the lip engaging portions into firm contact with opposed sides of the opening.

A second screw 16 is threaded through an aperture 17 in the wall of the offset 8 near its end opposite the aperture 13, and the inner end of the screw 16 is arranged to engage the tongue 10. It may be explained that the element 11 is of malleable material so that by driving the screw 16 inward the tongue 10 may be bent to clamp between it and the opposed wall of the body, the end of a conduit 20 which is previously inserted into the body until its forward end engages the shoulder 2. To enhance the clamping action, the wall may be provided with a barb or transverse rib 18.

Also, the inner face of the tongue 10 is transversely concaved preferably on an arc having a radius somewhat less than that of the interior of the body, so that longitudinal biting edges are provided for engagement with the conduit.

Now it may be explained that a longitudinal rocking action is permitted the retaining element by the looseness of the screw 12 within its aperture 13 of the body. Therefore, contraction and expansion of the lip engaging portions of the device may be accomplished to a material extent, solely by means of the screw 16. When the screw 16 is withdrawn to about the limit of its outward movement, the remote end of the retaining element may approach the lip engaging portion of the body for insertion through the opening of the box or receptacle. Thereafter, by driving the screw inward, the lip engaging portions are separated into holding engagement with the lips and further inward movement of the screw deforms the element into effective conduit clamping condition. Thus it will be seen that screw 12 is essential more as an adjusting and holding means than as an actuating device in attaching the coupler.

In Figs. 6 and 7 is shown a modification of the coupler wherein screw 12 is dispensed with and a single screw performs the double function of expanding the lip engaging portions and contracting the clamping parts. Here the body 30 is substantially identical with the former body 1, and the retaining element 31 differs from the corresponding element of the previous construction by having a transverse groove 32 in its inner face and a rib 33 across its outer face at substantially its longitudinal center. A pin 34 projects transversely through the body and occupies the groove 32 to prevent displacement of the retaining element and provide for it a fulcrum. As before, a screw, designated 35, is threaded through the wall of the offset and bears against the clamping end of the element and serves to rock the element upon the pin 34 to expand the lip engaging portions and, when necessary, to bend the element for firm clamping engagement with a conduit.

Having thus described my invention, what I claim is:

1. A device of the character set forth comprising a rigid tubular body, a retaining element within said tubular body, the body and element each having a lip engaging portion opposed to the corresponding portion of the other, and means for moving apart the lip engaging portions of the element and body.

2. A device of the character set forth comprising a rigid tubular body, a retaining element within said tubular body, the body and element each having a lip engaging portion opposed to the corresponding portion of the other, and means for moving said element substantially radially of the body.

3. A device of the character set forth comprising a rigid tubular body, a retaining element within said tubular body, the body and element each having a lip engaging portion opposed to the corresponding portion of the other, means loosely and adjustably connecting the element to the body, and further means for actuating the element to move apart the lip engaging portions of the element and body.

4. A device of the character set forth comprising a rigid tubular body, a retaining element within said tubular body, the body and element each having at one end a lip engaging portion opposed to the corresponding portion of the other, means for moving said end of the retaining element substantially radially outward with respect to the body, and further means for forcing the opposite end of the element inward in clamping relation to an opposed part of the body.

5. A device of the character set forth comprising a rigid tubular body, a retaining element within and extending along one side thereof, the body and element each having a lip engaging portion opposed to the corresponding portion of the other, means loosely connecting the element to the body so that the element may rock longitudinally with respect to the body, and means for rocking the element to move its lip engaging portion away from the lip engaging portion of the body.

6. A device of the character set forth comprising a rigid tubular body, a retaining element within and extending along one side thereof, the body and element each having a lip engaging portion opposed to the corresponding portion of the other, means loosely connecting the element to the body so that the element may rock longitudinally with respect to the body, and means for forcing the end of the element remote from its lip engaging portion inward.

7. A device of the character set forth comprising a tubular body, a retaining element movable substantially radially of said body, the element having biting lips on its inner face, and means for moving said element.

8. A device of the character set forth comprising a tubular body for the reception of the end of a conduit, a retaining element, means loosely connecting said element to said body, and further means for forcing said element into clamping relation with a wall of the body thereby to secure the conduit within the body.

9. A device of the character set forth comprising a tubular body having an inwardly opening channel extending along one side, a retaining element, means loosely supporting said element intermediate its ends within said channel, and a screw threaded through the wall of the body and engaging said element, as and for the purpose specified.

10. A device of the character set forth comprising a tubular body, a retaining element extending along the interior of one side thereof, the element and body each having a lip engaging portion that is opposed to the corresponding portion of the other, a screw passing freely through the wall of the body and threaded into the retaining element adjacent its lip engaging portion, and a screw threaded through the wall of the body and bearing against the end of the element remote from its lip engaging portion.

11. A device of the character set forth comprising a tubular element having an inwardly opening channel extending along one side, a retaining element within said channel and having a neck extension at one end which terminates in a lateral bead, the body having a neck extension at its corresponding end which terminates in a bead that is opposed to the bead of the element, means for retaining the element within the channel while permitting it to rock longitudinally, and means for forcing the end of the element remote from its neck toward the opposed wall of the body.

12. A device of the character set forth comprising a tubular element having an inwardly opening channel extending along one side, a retaining element within said channel and having a neck extension at one end which terminates in a lateral bead, the body having a neck extension at its corresponding end which terminates in a bead that is opposed to the bead of the element, means for retaining the element within the channel while permitting it to rock longitudinally, and means for moving apart the neck extensions of the element and body.

13. A device of the character set forth comprising a tubular body, a retaining element of malleable material extending along one side thereof, the body and element each having a lip engaging portion at one end opposed to the corresponding portion of the other, means loosely connecting the element to the body so that the element may rock longitudinally, and means for forcing the end of the element remote from its lip engaging portion into clamping relation with an opposed portion of the body.

In testimony whereof I hereunto affix my signature.

MORTIMER C. ROSENFELD.